United States Patent [19]

Fergason

[11] Patent Number: 4,603,945
[45] Date of Patent: Aug. 5, 1986

[54] LIQUID CRYSTAL GRAPHICS IMAGER AND METHOD

[75] Inventor: James L. Fergason, Atherton, Calif.

[73] Assignee: Manchester R & D Partnership, Pepper Pike, Ohio

[21] Appl. No.: 585,884

[22] Filed: Mar. 2, 1984

[51] Int. Cl.[4] ............................................. G02F 1/13
[52] U.S. Cl. ................................. 350/331 R; 350/334; 350/336; 350/320
[58] Field of Search ............... 350/331 R, 334, 336, 350/346

[56] References Cited

U.S. PATENT DOCUMENTS

| | | | |
|---|---|---|---|
| 3,600,060 | 8/1971 | Churchill et al. | 350/336 X |
| 3,622,226 | 11/1971 | Matthies | 350/334 |
| 3,703,331 | 11/1972 | Goldmacher et al. | 350/346 X |
| 4,012,122 | 3/1977 | McVeigh | 350/331 R |
| 4,110,794 | 8/1978 | Lester et al. | 350/331 R X |
| 4,194,833 | 3/1980 | Lester et al. | 350/331 R X |
| 4,239,345 | 12/1980 | Berreman et al. | 350/346 |
| 4,297,022 | 10/1981 | Lester | 350/331 R X |
| 4,334,734 | 6/1982 | Hareng et al. | 350/331 R |
| 4,386,836 | 6/1983 | Aoki et al. | 350/346 X |
| 4,435,047 | 3/1984 | Fergason | 350/334 |

OTHER PUBLICATIONS

Clark, W. D., "Copier Printhead," *IBM Technical Disclosure Bulletin*, vol. 19, No. 7 (Dec. 1976) p. 2447.

Primary Examiner—John K. Corbin
Assistant Examiner—Richard F. Gallivan
Attorney, Agent, or Firm—Renner, Otto, Boisselle & Lyon

[57] ABSTRACT

An image copying apparatus includes a copier for copying an image and an imager which forms characteristics of the image. The imager includes a liquid crystal image forming and storing system for forming in real time characteristics of an image in response to a prescribed input and for temporarily storing those characteristics for a time adequate for the copier to copy the same and a scanning device to scan the image forming and storing device to apply the characteristics thereto. In one embodiment the liquid crystal is operationally nematic liquid crystal encapsulated or contained in a support medium that has a capacitance characteristic, and the scanning device includes a dynamic electrode which applies surface charge to selected areas of the encapsulated liquid crystal/support medium affecting the liquid crystal structural alignment to create the image characteristics.

A graphics copying method includes the steps of applying respective prescribed inputs to selected areas of a sheet-like liquid crystal material to cause the liquid crystal material to effect the transmission, scattering or absorption of incident light thereby to form characteristics of an image, and using a copying process copying the characteristics to form a copy of such image.

49 Claims, 6 Drawing Figures

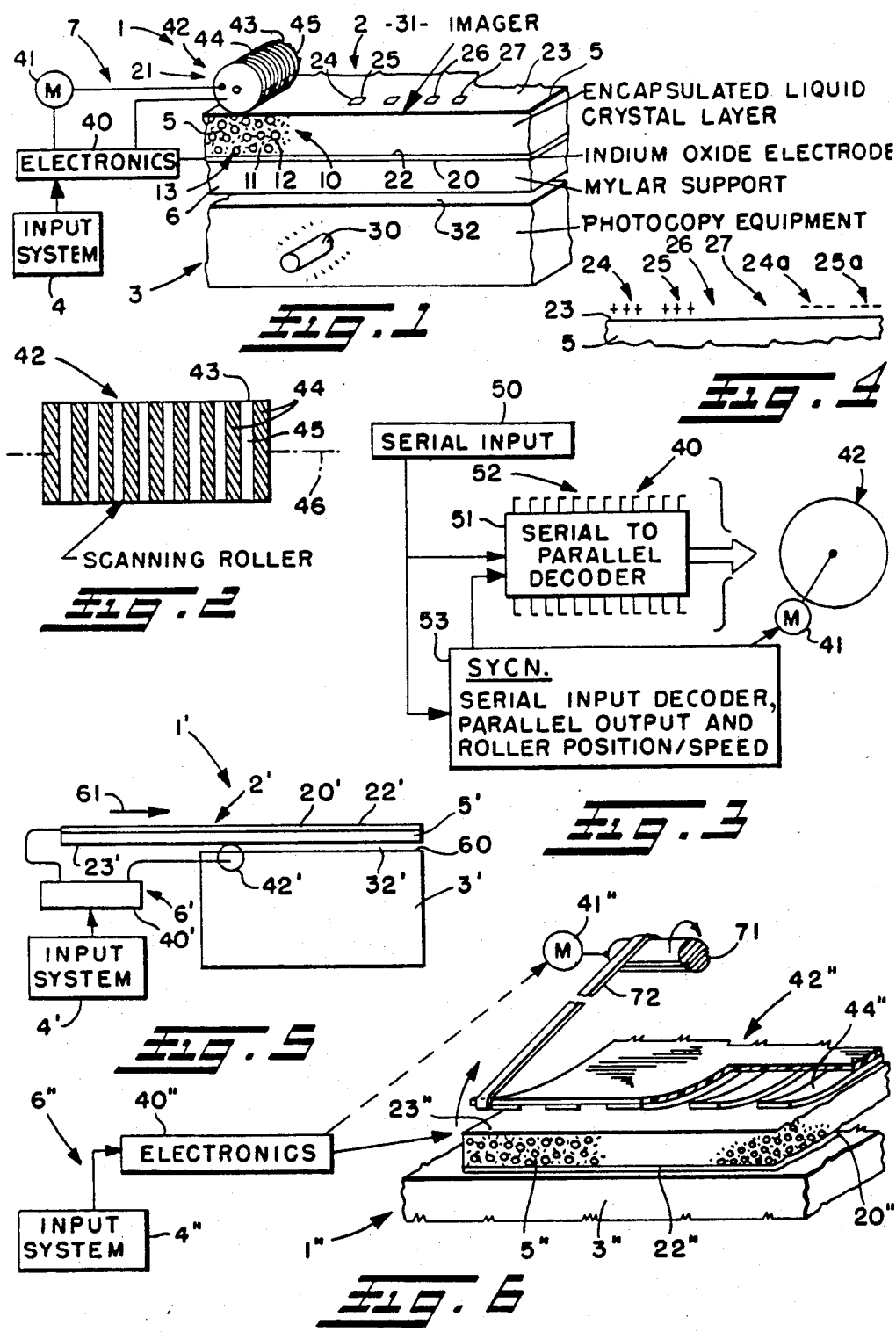

LIQUID CRYSTAL GRAPHICS IMAGER AND METHOD

TECHNICAL FIELD

The present invention relates generally, as indicated, to graphics imagers and to a method for forming graphic images, and, more particularly, to a graphics imager using liquid crystal material for temporarily forming and storing in real time an image and to a method for copying the temporarily stored image.

BACKGROUND

One type of conventional graphics imager is the document copier often used in an office environment to copy text and/or graphics from one document to another. Exemplary copier machines of this type include, for example, those sold under the trademarks XEROX (which uses a so-called Xerography process), KODAK, 3-M, SHARP, and others. Such copiers operate at various speeds, often being relatively fast and able to produce ten or more copies per minute. One disadvantage of such copiers is that in the usual case there must be a document to copy, and that document must be fed directly through or placed on or in the copier machine.

A telecopier or facsimile machine is able to receive and to decode electrical signals which carry information along telephone lines, or other electrical lines, from a source remote from the machine and to form on a document the graphic image represented by such electrical signal information. However, such facsimile machines are relatively slow, typically being able to produce only two letter-size copies per minute, even at the fastest rates currently available using a CCITT Group III machine.

It would be desirable to speed the transfer of alphanumeric and graphical information or data between two remote machines accomplishing, for example, the reproduction speed of the aforementioned copier machines, on the one hand, and the remote transmission/receiving capability of the aforementioned facsimile machines.

BRIEF SUMMARY OF THE INVENTION

The present invention provides the ability to produce relatively rapidly a so-called hard copy of alphanumeric and/or graphical data from information received from a remote source and/or from a local source. Importantly, the invention permits the formation of an image in real time or substantially in real time, e.g. essentially immediately on receipt of the incoming data or information, and that image is stored for a period that is adequate to permit copying of the image using, for example, conventional copier machine technology, such as xerography technology or the like.

The primary limiting factor on the speed of operation to produce a hard copy using the invention, then, would be the speed at which data could be transmitted, on the one hand, and the speed of operation of the copier machine used to copy the temporarily stored image.

Thus, according to one aspect of the invention, an image copying apparatus includes a copier device for copying an image and an imager device for forming characteristics of the image; the imager device includes an image forming and storing device for forming in real time characteristics of an image in response to a prescribed input and for temporarily storing such characteristics for a time adequate for the copier device to copy the same and a scanning system for scanning the image forming and storing device to apply such characteristics thereto. The copier and imager are relatively positioned to enable the copier to make a copy of an image represented by the characteristics formed and stored by the image forming and storing device.

According to another aspect of the invention, an imager includes a liquid crystal device having an alterable optical function for affecting the transmission, scattering or absorption of light incident thereon, a support for supporting the liquid crystal device in sheet-like lay out, the liquid crystal device being responsive to a prescribed input to alter such optical function to form characteristics of an image, an input device for selectively applying the prescribed input to respective portions of the liquid crystal device, and the liquid crystal device having a memory function for temporarily storing the image characteristics after termination of a direct input thereto by the input device.

According to a further aspect of the invention an apparatus for mechanically depositing electric charge to a surface of a sheet-like liquid crystal material having opposite surfaces, includes a dynamic electrode having plural electrode means respectively electrically isolated from each other for applying electrical surface charge with respect to selected surface areas of such sheet-like liquid crystal material, electrical means for applying an electrical voltage to respective electrode means, and movement means for effecting relative movement of said dynamic electrode and such sheet-like liquid crystal material.

According to an additional aspect of the invention there is provided a combination of a sheet of liquid cyrstal material having optical characteristics alterable in response to application of an electric charge, and deposition means for mechanically depositing surface charge to selected surface areas on one side of said sheet to alter such optical characteristics.

According to yet another aspect of the invention, a method for creating an electric field across selected locations of a sheet-like liquid crystal device includes effecting relative movement of a dynamic electrode having plural electrodes and such sheet, and applying voltage to one or more selected electrodes during such relative movement.

According to yet a further aspect of the invention, a graphics copying method includes the steps of applying respective prescribed inputs to selected areas of a sheet-like liquid crystal material to cause the liquid crystal material to affect the transmission, scattering or absorption of incident light thereby to form characteristics of an image, and using a copying process copying such characteristics to form a copy of such an image.

In one embodiment of the invention the liquid crystal device of the imager includes encapsulated liquid crystal material formed as and/or supported on a sheet. Such encapsulated liquid crystal material is capable of absorbing, scattering, and/or transmitting light in response to a prescribed input, such as an electric field. The encapsulated liquid crystal material has an electrical capacitance characteristic and, therefore, is capable of temporarily storing an electrical charge applied thereto. According to the invention, then, electrical charge selectively is applied to designated areas of the encapsulated liquid crystal material for temporary storage there. Characteristics of an image, then, are created by the encapsulated liquid crystal material as a function of the respective areas thereof that are storing an electrical charge (and also as a function of the magnitude of such stored electrical charge and the electric field produced thereby) and those areas of the liquid crystal material where there is no electrical charge stored. A scanning mechanism according to the invention facilitates the scanning or traversing of the encapsulated liquid crystal material selectively, for example by a dynamic electrode, to apply such electrical charge thereto, and the image characteristics formed by the encapsulated liquid crystal material may be copied using, for example, conventional photocopy or copier equipment.

Preferably according to the invention encapsulated liquid crystal technology is used in the imager. Preferably the encapsulated liquid crystal material is of the operationally nematic type, which has the advantageous characteristics of prompt response to the application or removal of an electric field, reversability, and the ability to scatter, to absorb, and/or to transmit light controllably in response to the application or removal of such prescribed input.

Some terms used herein generally are defined as follows: "liquid crystal material" broadly refers to any type of liquid crystal material that will work in the context of the present invention, but preferably refers to operationally nematic liquid crystal material. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, chiral ingredients which induce a tendency to twist but cannot overcome the effects of boundary alignment would still be considered operationally nematic. Such operationally nematic liquid crystal material may include pleochroic dyes, non-pleochroic dyes, chiral compounds, or other co-ingredients. A capsule refers to a containment device or medium that contains or confines a quantity of liquid crystal material, and "encapsulating medium" or "material" is that medium or material of which such capsules are formed. The capsules may be closed, e.g. as a closed sphere, having an interior volume containing liquid crystal material or may be partially closed so as to define a specified volume for containing the liquid crystal material while one or more passageways actually interconnect the interior volumes of two or more such capsules. An "encapsulated liquid crystal" or "encapsulated liquid crystal material" means a quantity of liquid crystal material confined or contained in the capsules of either or both types formed by and/or in the encapsulating medium, for example in a solid medium as individual capsules or dried stable emulsions.

Capsules according to this invention generally have an approximately spherical configuration (though this is not, per se, a requisite of the invention) having a diameter from about 0.3 to 100 microns, preferably 0.1 to 30 microns, especially 0.5 to 15 microns, for example most preferred 1 to 5 microns. In the context of this invention, encapsulation and like terms refer not only to the formation of such articles as are generally referred to as capsules, but also to the formation of stable emulsions or dispersions of the liquid crystal material in an agent (an encapsulating medium) which results in the formation of stable, preferably approximately uniformly sized, particles in a uniform surrounding medium. Techniques for encapsulation, generally referred to as microencapsulation because of the capsule size, as well known in the art (see, e.g., "Microcapsule Processing and Technology" as Asaji Kondo, published by Marcel Dekker, Inc.) and it will be possible for one skilled in the art, having regard to the disclosure herein, to determine suitable encapsulating agents and methods for liquid crystal materials.

One method of making encapsulated liquid crystals includes mixing together liquid crystal material and an encapsulating medium in which the liquid crystal material will not dissolve and permitting formation of capsules containing the liquid crystal material.

A method of making a liquid crystal device including such encapsulated liquid crystal includes, for example, applying such encapsulated liquid crystal material to a substrate. Moreover, such method may include providing means for applying an electric field to the liquid crystal material to affect a property thereof.

To effect coloring of the imager, non-pleochroic dye may be included in the liquid crystal and/or encapsulating medium.

To help assure that adequate electric field is applied across the liquid crystal material in the capsule, and not just across or through the encapsulating medium, and, in fact, with a minimum voltage drop across the wall thickness of the respective capsules, the encapsulating material preferably has a dielectric constant no less than the lower dielectric constant of the liquid crystal material, on the one hand, and a relatively large impedance, on the other hand. Ideally, the dielectric constant of the encapsulating medium should be close to the higher dielectric constant of the liquid crystal.

Contrast of a liquid crystal device employing encapsulated liquid crystals may be improved by selecting an encapsulating medium that has an index of refraction that is matched to the ordinary index of refraction of the liquid crystal material (i.e. the index of refraction parallel to the optical axis of the crystal). See, e.g. "Optics" by Born and Wolf, or "Crystals and the Polarizing Microscope" by Hartshorne and Stewart. The encapsulating medium may be used not only to encapsulate liquid crystal material but also to adhere the capsules to a substrate for support thereon. Alternatively, a further binding medium may be used to hold the liquid crystal capsules relative to a substrate. In the latter case, though, preferably the additional binding medium has an index of refraction which is matched to that of the encapsulating medium for maintaining the improved contrast characteristic described above. Because the index of refraction of a material is generally strain-dependent, and strain may be induced in, e.g. the encapsulating medium, it may be necessary to consider this effect in matching the indices of refraction of the liquid crystal, encapsulating medium, and binding medium, if present. Further, if irridescence is to be avoided, it may be desirable to match the indices of refraction over a range of wavelengths to the extent possible, rather than at just one wavelength.

A feature of the spherical or otherwise curvilinear surfaced capsules which generally confine the liquid crystal material therein in accordance with the present invention is that the liquid crystal material tends to be forced or distorted to a specific form, being folded back on itself in a sense as it follows and/or generally aligns parallel or normal to the capsule wall, so that the resulting optical characteristic of a given capsule containing liquid crystal material is such that substantially all light delivered thereto will be affected, for example, scattered (when no pleochroic dye is present) or absorbed (when pleochroic dye is present), when no electric field is applied, regardless of the polarization direction of the incident light. Even without dye this effect can cause scattering and thus opacity. However, in response to application of an electric field to the encapsulated liquid crystal material, the liquid crystal structure aligns with the field and scattering or absorption of light is reduced.

Preferred encapsulated liquid crystal material useful in the present invention is disclosed in co-pending U.S. patent applications Ser. Nos. 302,780, filed Sept. 16, 1981 (now U.S. Pat. No. 4,435,047); 477,078, (now U.S. Pat. No. 4,556,289); and 477,242, all filed Mar. 21, 1983; 480,466 and 480,461 both filed Mar. 30, 1983; and Ser. No. 585,883, filed concurrently herewith, for "Encapsulated Liquid Crystal Material, Apparatus and Method". All of such applications are by the same inventor as the instant application, and the disclosures of such applications hereby are incorporated in their entireties by this specific reference thereto.

Operation of encapsulated liquid crystal material to absorb or to scatter light in the absence of a prescribed input, for example an electric field, and to reduce such absorption or scattering in the presence of such prescribed input is disclosed, for example, in the earliest above mentioned application. However, in the preferred embodiment of the present invention, the operation of encapsulated liquid crystal material to scatter light in the absence of the prescribed input and the use of the encapsulating medium or other material to effect reflection, preferably total internal reflection and/or constructive optical interference, to brighten the appearance of liquid crystal material that is in a scattering mode, i.e. in the absence of a prescribed input, is employed; and disclosure of such operating principle is presented, for example, in the above mentioned application Ser. No. 477,138. Where the scattering is reduce in response to application of the prescribed input to the encapsulated liquid crystal material according to the preferred embodiment, the internal reflection and constructive optical interference are reduced, indeed destructive interference ordinarily would be encountered, and, accordingly, using such encapsulated liquid crystal material images having good contrast ratio can be obtained.

To the accomplishment of the foregoing and related ends, the invention, then, comprises the features hereinafter fully described in the specification and particularly pointed out in the claims, the following description and the annexed drawing setting forth in detail certain illustrative embodiments of the invention, these being indicative, however, of but several of the various ways in which the principles of the invention may be suitably employed.

BRIEF DESRIPTION OF THE DRAWING

In the annexed drawing:

FIG. 1 is a fragmentary schematic side elevation/perspective view of a liquid crystal graphics imager in accordance with the preferred embodiment and best mode of the present invention;

FIG. 2 is a plan view of the rolling dynamic electrode of the imager of FIG. 1;

FIG. 3 is a schematic block diagram of the electronics portion of the graphics imager of FIG. 1;

FIG. 4 is a fragmentary side elevation view of the sheet-like liquid crystal material of FIG. 1 with respective surface charges applied to the surface thereof;

FIG. 5 is a schematic illustration of a complete liquid crystal graphics imager in accordance with the present invention employing a copier having a movable image/document carrier; and FIG. 6 is a schematic view in isometric format showing an alternate embodiment of graphics imager using a pull-back multiple electrode sheet dynamic electrode.

DETAILED DESCRIPTION OF THE INVENTION

Referring now in detail to the drawing, wherein like reference numerals designate like parts in the several figures, and initially to FIG. 1, a liquid crystal graphics imager 1 in accordance with the present invention is shown. The fundamental components of the graphics imager are an imager 2 and a copier 3. The imager 2 converts input information received from an input system to an image capable of being copied by the copier 3. The imager 2 includes an encapsulated liquid crystal layer 5 mounted on a sheetlike support 6, for example of Mylar or similar relatively strong optically transparent material, and a signal input apparatus 7 which in response to the information received from the input system 4 applies a prescribed input, in the preferred embodiment a voltage that produces an electric field, to selected areas of the encapsulated liquid crystal layer 5 thereby to form an image represented by the information received from the input system 4.

The copier 3 may be any one of a variety of conventional socalled photocopiers, for example of the Xerography or other type. Exemplary manufacturers and/or brand names of such copier equipment are noted above. The imager 2 is mounted with respect to the copier 3 in position to be scanned optically, for example, as ordinarily might be the case when such copier would be used to scan a so-called hard copy document, e.g. a piece of paper with alphanumeric or graphic information thereon, and the copier 3 is capable of producing an output document that is a copy of the one on the imager so optically scanned.

Moreover, the imager 2 preferably is capable of forming an image representing the information received from the input system 4 essentially in real time, i.e. essentially at the same time that the information is received from the input system 4 without requiring any slow-down of the rate at which the input information is received. Additionally, the imager 2 is capable of storing or maintaining such image for a period adequate to permit copying thereof by the copier 3. Furthermore, the liquid crystal graphics imager 1 preferably is capable of substantially continuous use to form one image after another and to copy each of the images. The limitations on speed of operation of the liquid crystal graphics imager 1 may be, for example, the rate at which information can be received at the input system 4, the rate at which such input information can be converted to an image, which may be effected essentially simultaneously upon receipt of the information, and the operational speed of the copier 3.

The encapsulated liquid crystal layer 5 is encapsulated liquid crystal material 10 formed of a containment medium or encapsulating medium 11 and liquid crystal material 12. Exemplary materials for the containment medium 11 include, for example, polymers, for example polyvinyl alcohol (PVA), gelatin, latex and various other materials, for example which are mentioned in the aforementioned patent applications. The liquid crystal material 12 preferably is nematic or operationally nematic and, for example, may be of one or more of the liquid crystal materials disclosed in the aforementioned patent applications. The containment medium 11 and liquid crystal material 12 cooperate to form a plurality of capsules, volumes, containment areas, or the like generally represented at 13, each of which may be closed or partly closed, in the latter case two or more of the socalled capsules may be fluidically coupled by interconnecting passageways like in a matrix formed of the medium and liquid crystal. The interior wall of a capsule generally tends to distort the structure of the liquid crystal material therein causing the same to assume a distorted or generally curvilinearly aligned structure, as opposed to the usual straight line parallel structure that nematic liquid crystal material tends to assume in the absence of a prescribed input, hereinafter referred to as an electric field, which is the preferred prescribed input in accordance with the invention. Such distorted structure typically would be aligned generally either parallel or normal to the capsule wall. However, in the presence of such electric field, the structure of the liquid crystal material 12 in the capsules 13 tends to align with respect to the field. On removal of the field again, though, the capsule wall effects the aforementioned distorted alignment. A plurality of capsules 13 preferably several capsules thick preferably make up the encapsulated liquid crystal layer 5 generally as is represented in the illustration of FIG. 1. The overall thickness of such layer 5 may be, for example, from about 0.3 mil to about 10 mils (about 0.5 mil being preferred), and the approximate diameter of each capsule may be, for example, from about 0.3 micron to about 100 microns, or one of the ranges above, with about 1 micron to about 5 microns being preferred. The capsules may be arranged in discrete layers or, more preferably, in a generally random, but nevertheless relatively close packed relation generally as is shown in the illustration of FIG. 1.

The liquid crystal material 12 is optically anisotropic having ordinary and extraordinary indices of refraction; and the containment medium 11 preferably is substantially optically transparent, for example from the ultraviolet to the far infrared wavelength range. The index of refraction of the containment medium 11 and the ordinary index of refraction of the liquid crystal material 12, i.e. the index of refraction parallel to the optical axis of the liquid crystal (and occurring in the presence of an electric field which aligns the liquid crystal, as aforesaid) are optically matched so that in the presence of an electric field light may be transmitted substantially directly through the layer 5 without or at least with only a minimum of refraction at interfaces between liquid crystal material 12 and containment medium 11. However, the extraordinary index of refraction of the liquid crystal material should be different from the index of refraction of the containment medium thereby to increase the refracting and scattering of light in the encapsulated liquid crystal layer 5 in the absence of an electric field.

The electrical characteristics of the containment medium 11 and the liquid crystal material 12 are such that preferably in response to the application of a voltage thereto the major electric field produced thereby will be across the liquid crystal material and minimum voltage drop will occur across the encapsulating medium itself. Accordingly, the containment medium 11 should have a dielectric constant no less than the lower dielectric constant of the liquid crystal material, which is electrically anisotropic, and a relatively large impedance. Ideally, the dielectric constant of the encapsulating medium 11 should be close to the higher dielectric constant of the liquid crystal material, too Viewed on a so-called macroscopic or collective level, the encapsulated liquid crystal layer 5 essentially is a dielectric material having an average dielectric constant value, which may vary slightly during use, e.g. according to application or removal of an electric field to the liquid crystal material 12, and which also may be a function of the overall materials of which the layer 5 is composed. Accordingly, the encapsulated liquid crystal layer 5 has the ability to function as a capacitor storing an electric charge, namely a voltage, which may be applied thereacross, more specifically by electrodes 20, 21 at the respective surfaces 22, 23 of the layer 5. As is described further below, then, it is the function of the signal input apparatus 7 to apply surface charge to selected areas of the layer 5 for temporary storage and to create the image characteristics in the liquid crystal material for copying.

Therefore, in response to selective application of a voltage or electric field at certain areas of the encapsulated liquid crystal layer 5, for example at areas 24 and 25 represented on the surface 23 and the non-application of electric field to other selected areas of the layer 5, for example at areas 26 and 27 represented on the surface 23, alignment or not of that liquid crystal which is directly between such respective area on surface 23 and the electrode 20 at surface 22, or non-alignment (when no field is applied at a given area) can be achieved. Due to the effective capacitance of the encapsulated liquid crystal layer 5, when a charge is applied to a selected area, say at 24, 25, etc., such charge is stored and takes a finite time, for example several seconds or longer, to dissipate; and for the duration of such storage charge, the effect of the electric field produced across the selected encapsulated liquid crystal material generally aligned between such area and the surface 22 and electrode 20 will remain in the desired alignment with respect to such field. Accordingly, by selecting particular areas of the encapsulated liquid crystal layer 5 at which electric field is to be applied, a representation of an image can be formed and stored by the encapsulated liquid crystal layer 5.

To complete the effective formation of an image by the imager 2 in response to such selective application of charge to various areas thereof, illumination is required. Although such a source of illumination may be derived from an external source that illuminates the surface 23, according to the preferred embodiment and best mode of the invention the source of illumination is provided by the light source schematically represented at 30 in the copier 3 itself. Such light source 30 may illuminate the entire encapsulated liquid crystal layer 5 simultaneously or only that portion thereof being copied at any given instant, whereby effective scanning of the image characteristics formed by the layer 5 is carried out by the copier 3.

Effective formation of a viewable image capable of scanning by such light source 30 and copier 3, for example, preferably is carried out in accordance with the disclosure in the above mentioned application Ser. No. 477,138. Specifically, using the principle of total internal reflection, and possibly also optical interference, light which is scattered, preferably isotropically scattered, by that encapsulated liquid crystal material in the layer 5 to which an electric field is not applied, e.g. that liquid crystal material which is in the curvilinearly aligned or distorted structure condition, will be reflected or redirected back to such encapsulated liquid crystal material brightening the same. A portion of the light scattered by such liquid crystal material also will scatter toward the copier for "observation" thereby. On the other hand, light, for example from the light source 30, which impinges onto that encapsulated liquid crystal material 10 in the layer 5 which is aligned with respect to an electric field will tend not to be scattered and, rather, will tend to pass directly through such liquid crystal material and the layer 5 thereby creating the appearance of the dark area in the layer 5 relative to the brighter area where the liquid crystal material is in the distorted or field-off condition. It will be appreciated that by selecting those areas, e.g. 24–27, and so on, where surface charge is or is not to be applied to the surface 23 in order to apply an electric field to selected encapsulated liquid crystal material in the layer 5, both alphanumeric and graphical images can be created, and those images can be copied by the copier 3.

As is disclosed in the above mentioned application Ser. No. 477,138, the desired total internal reflection operation of the layer 5 requires that the index of refraction of the containment medium 11 be larger than the index of refraction of the medium 31, such as air, which forms an interface with the surface 23. Preferably also the support 6 on which the layer 5 and electrode 20 are supported is optically transparent and has an index of refraction that is substantially the same as the index of refraction of the containment medium 11 to minimize distortion, namely refraction, at the multiple interfaces between the layer 5 and electrode 20 and between the electrode 20 and the support 6. Such support 6 may be, for example, a polymer or plastic film-like or sheet-like material, such as that sold under the trademark Mylar. Moreover, the index of refraction of the support 6 should be greater than the index of refraction of the medium 32 to achieve total internal reflection of light at the interface between the surface of the support 6 and the medium 32, such as air, for example. Depending on the ratio(s) of the various indices of refraction to which reference just has been made, a light beam or light ray within the layer 5 or support 6 impinging on an interface with the medium 31 or medium 32 at an angle exceeding a prescribed angle relative to the normal will be totally internally reflected at such interface. Additionally, if desired, a dielectric coating of appropriate thickness may be applied at one or both of the aforementioned interfaces to improve the effective relfection of light within the layer 5 and/or support 6 according to the principles of optical interference as also is described in the application Ser. No. 477,138. Further, if desired, an optical absorber, such as a black or colored background or light absorbing material may be placed on surface 23 or beyond in the medium 31 to absorb light passing through the layer 5, for example at areas 24, 25 thereof where electric field is applied to the encapsulated liquid crystal material and the structure of such liquid crystal material is aligned with such electric field thereby to enhance further the contrast between the relatively bright and relatively dark portions of an image composed in the layer 5, as aforesaid. As still another alternative, a reflector may be placed at or proximate the surface 23 to reflect light back into the layer 5.

Responding to the information received from the input system 4, the signal input apparatus 7 decodes such information and based thereon applies surface charge to selected areas of the surface 23 of the encapsulated liquid crystal layer 5. The signal input apparatus 7 includes an electronics portion 40, a drive motor 41 which operates in response to control signals and/or power from the electronics portion (possibly power may be provided from an external source, not shown), and a dynamic electrode 42. The dynamic electrode 42 is shown as a generally cylindrical scanning roller 43, which is seen in front elevation view in FIG. 2. Scanning here refers to relative movement occurring between the dynamic electrode 42 and the surface 23 to enable various locations on such surface in a sense to be addressed and to receive surface charge. Preferably the roller 43 is of electrically non-conductive material, and the roller has thereon a plurality of electrically conductive electrode strips 44. The electrode strips 44 are formed on or attached to the non-conductive exterior surface 45 of the roller and are electrically isolated from each other. The electrode strips 44 extend in annular fashion preferably completely circumferentially about the roller 43. The electrode strips 44 respectively are positioned in planes that are perpendicular to the axis 46 of the roller 43 so that as the roller rolls along the surface 23 preferably in a direction perpendicular to the roller axis and without slippage on the encapsulated liquid crystal layer 5, each rotating electrode strip 44 follows a straight line path along such surface 23.

As is seen in FIGS. 1, 2 and 3, the electronics portion 40 cooperates with, monitors, and controls the motor 41, the position of the dynamic electrode 42 along the surface 23, and the voltage applied (or not applied) to respective electrode strips 44. The electronics portion 40 also is connected to the electrode 20, which preferably is over the entire lower surface 22 of the encapsulated liquid crystal layer 5, and the potential of such electrode 20 is maintained, for example, at a relative ground potential so that voltage applied to an area of the surface 23 by an electrode strip 44 would be with respect to such ground or other reference potential.

In the electronics portion 40 the information from the input system 4, for example in the form of a serial input represented at 50, is converted to parallel information by a conventional serial to parallel decoder 51. The serial to parallel decoder 51 may be a conventional serial to parallel decoder, such as an integrated circuit device, for example a UART (universal asynchronous receive transmit device), or a plurality of the same, which produce parallel information on the parallel output lines 52 directly representative of the serial input information. Such parallel output lines 52 are respectively connected to the individual electrode strips 44 to apply any voltage on the respective output line to a respective electrode strip. If necessary various conventional logic circuitry may be used to decode the input data from the input system 4 to derive the parallel output data as the roller 43 rolls along the surface 23. Accordingly, the respective electrode strips 44 apply such voltage(s) to the particular area(s) of the encapsulated liquid crystal layer 5 surface 23 with which such electrode strips 44 at that moment are engaged. Moreover, as the dynamic electrode 42 rolls along the surface 23, such rolling movement is monitored and controlled by a synchronizing portion 53 of the electronics portion 50.

The synchronizing portion 53 in response to information from the serial input 50 synchronizes rolling movement of the dynamic electrode 42 and the signals produced on the serial to parallel decoder 51. In operation of the signal input apparatus 7, then, information, for example in the form of serial data, is received from the input system 4. That data is converted by the decoder 51 to parallel data supplied on the output lines 52 to respective electrode strip 44 when the dynamic electrode 42 is at a particular location on the surface 23 of the encapsulated liquid crystal layer 5; the foregoing is controlled according to the synchronization circuit 53 which operates the motor 41 that moves the dynamic electrode 42 and also preferably monitoring position of the dynamic electrode 42. The synchronization circuit 53 continues to allow the motor 41 to move the dynamic electrode 42 along the surface 23 as additional information is received from the input system and the circuit 53 also continues to allow the decoder 51 to decode the new information and to provide appropriate alterations in the signals on the output line 52 which if necessary appropriately alter the voltage applied to respective electrode srips 44 depending on the nature of the input information. As the dynamic electrode 42 rolls along the surface 23, then, the electrode strips 44 apply surface charge to selected areas, such as areas 24, 25. Such surface charge results in the application of an electric field between the respective area and the electrode 20 at the opposite surface 22 of the encapsulated liquid crystal layer 5 causing parallel alignment of the encapsulated liquid crystal material 10 therebetween. As was mentioned above, the encapsulated liquid crystal layer 5 has dielectric and resistive characteristics so as to be capable of storing such surface charges at the respective areas for a period of time that is adequate for the copier 3 to copy the image effectively created in the encapsulated liquid crystal layer 5, as aforesaid.

Using the liquid crystal graphics imager 1, information received from the input system 4, for example from a remote terminal, facsimile machine, computer, etc., can be decoded promptly essentially in real time, i.e. essentially immediately on receipt, and is utilized by the imager 2 to create an image that can be copied promptly by the copier 3. Therefore, for example, as the dynamic electrode 42 moves across the layer 5 an image is formed and may be copied. Thereafter, the electrode 42 is returned to starting position to begin another scan; or the next scan may occur as the electrode 42 rolls back to the starting position to form another image for copying.

As is shown in FIG. 4, different surface charges can be applied to different surface areas of the surface 23. For example, at areas 24 and 25 a positive charge has been deposited, and at areas 26 and 27 there is no charge. The deposited charge may be positive or negative. For example, at areas 24a and 25a negative charge is shown. Also, if desired, to expedite discharging an area of a given polarity, a charge of opposite polarity or a ground discharging connection made via the respective electrode strip passing over the respective area may be employed.

Briefly referring to FIG. 5, an alternative embodiment of a liquid crystal graphics imager in accordance with the invention is shown at 1'. In FIG. 5, primed reference numerals designate parts corresponding to those described above with reference to FIGS. 1-3 without the prime identifier. Accordingly, the graphics imager 1' includes an imager 2', a copier 3', and a signal input apparatus 7'. The graphics imager 1' uses the movable carrier or platen type copier 3', as opposed to a fixed platen type copier, for example which may be considered represented in FIG. 1, and, accordingly, the encapsulated liquid crystal layer 5' is movable across the top surface 60 of the copier 3'. The encapsulated liquid crystal layer has an electrode 20' on the top surface thereof and may also have a further support similar to that shown at 6 in FIG. 1, although such support is not shown in FIG. 4 and may be unnecessary, depending on the nature of the containment medium 11 and the ability thereof to form a secure strong support independently of a support like that shown at 6 in FIG. 1. The dynamic electrode 42' is located beneath the encapsulated liquid crystal layer 5' and remains in relatively fixed position with respect to the copier 3'. However, during operation of the graphics imager 1', conventional means (not shown) are used to move the encapsulated liquid crystal layer 5' along the dynamic electrode 42' and over the top 60 of the copier 3', for example in the direction of the arrow 61 to effect application of appropriate surface charge and, accordingly, creation of the desired image for copying by the copier 3' when the image is in an appropriate place for copying by the copier apparatus. The electronics portion 40' may be similar in composition and function to the electronics portion 40 described above; and the overall liquid crystal graphics imager 1' may function in general like the graphics imager 1 described above.

A further modified liquid crystal graphics imager according to the invention is shown at 1" in FIG. 6 wherein double primed reference numerals designate elements corresponding to those with unprimed reference numerals described above with reference to FIGS. 1-3. In the graphics imager 1" the dynamic electrode 42" comprises a flexible sheet 70 of electrically non-conductive material having on the lower surface thereof, or in any event the surface that is more proximate the encapsulated liquid crystal layer 5", a plurality of electrode strips 44". The electronics portion 40" is connected to the respective electrode strips 44", as above, and synchronizes application of signals to the electrode strips and operation of the motor 41" as it drives a pulley or take-up reel schematically represented at 71. Specifically, the take-up reel 71 is connected by a rope or wire 72, for example, and is intended to peel the sheet 70 off the surface 23" of the liquid crystal layer 5". During such peeling or peel-back operation, the electrode strips leave at respective areas of the surface 23" surface charge which effects the application of an electric field to create the characteristics of an image in the encapsulated liquid crystal layer 5", as above. After the sheet 70 has been pulled back fully, the surface charges at respective areas of the surface 23" temporarily are stored for copying by the copier 3". Afterwards, the electronics portion 40" allows the motor 41" to operate the pulley 71 to drop the sheet 70 back onto the liquid crystal layer 5" placing the electrode strips 44" into engagement with the surface 23" ready for the formation of the next image. It will be appreciated that the pulley 71 and rope or wire 72 are only schematically representative of a means that would be capable of accurately operating the dynamic electrode 42"; other appropriate equivalent means, such as various fixed and flexible linkages and drive systems may be employed.

Thus, in operation of the present invention, prescribed inputs may be applied by the dynamic electrode to selected areas of a sheet-like liquid crystal material to cause the liquid crystal material to affect the transmission, scattering or absorption of incident light thereby to form characteristics of an image. A conventional copying process then may be used to copy the characteristics of such image to form a copy thereof. The invention is not limited to the type of data that may be copied; for example, alphanumeric, graphical, or even other data may be copied.

I claim:

1. An imager, comprising:
    liquid crystal means having an alterable optical function for affecting the transmission, scattering or absorption of light incident thereon.
    support means for supporting said liquid crystal means in sheet-like layout,
    said liquid crystal means being responsive to a prescribed input to alter such optical function to form characteristics of an image, such prescribed input comprising an electric field,
    input means for selectively applying such prescribed input to respective portions of said liquid crystal means, and
    said liquid crystal means having a memory function for temporarily storing such characteristics after termination of a direct input thereto by said input means, said memory function comprising charge storage.

2. The imager of claim 1, said support means comprising containment means for containing said liquid crystal means in capsule-like volumes.

3. The imager of claim 1, said liquid crystal means comprising operationally nematic liquid crystal having positive dielectric anisotropy.

4. The imager of claim 1, further comprising containment medium means for containing said liquid crystal means in closed or partly closed capsule-like volumes, said liquid crystal means having positive dielectric anisotropy, said containment medium means being substantially optically transparent and having an index of refraction substantially matched to the ordinary index of refraction of said liquid crystal means and different from the extraordinary index of refraction of said liquid crystal means.

5. The imager of claim 4, said liquid crystal means comprising operationally nematic liquid crystal material and said containment medium means comprising means for distorting the natural structure of the liquid crystal material in the absence of an electric field, and said input means comprising electrode means for applying an electric field to selected areas of said liquid crystal means to cause the liquid crystal structure to align with respect to such field to reduce such scattering or absorption and to increase such transmission.

6. The imager of claim 5, wherein at least one of said containment medium means and said support means is totally internally reflective of some light scattered therein by said liquid crystal material to effect re-illumination of such liquid crystal material that scatters such light.

7. The imager of claim 6, said support means comprising a plastic sheet.

8. The imager of claim 6, said containment medium means and said liquid crystal means being in the form of a substantially stable emulsion.

9. The imager of claim 1, said liquid crystal means having a capacitance characteristic enabling the same to store such voltage charge as a surface charge to provide memory function.

10. The imager of claim 9, said means for applying comprising a dynamic electrode means operable to apply surface charge directly to said other surface of said liquid crystal means.

11. The imager of claim 9, said liquid crystal means comprising operational nematic liquid-crystal having positive dielectric anisotropy and a containment medium means for holding said liquid crystal in plural respective volumes and for distorting the natural structure of said liquid crystal to scatter light, such electric field effecting alignment of the liquid crystal with respect thereto to reduce scattering of light, and said stored surface charge storage being operative to maintain application of electric field to such liquid crystal for a duration adequate to permit copying of an image formed by said liquid crystal means.

12. The imager of claim 9, said liquid crystal means having opposite surfaces, and said input means comprising an electrode proximate one of said liquid crystal means and a dynamic electrode for applying surface charge to selected areas of the other surface of said liquid crystal means.

13. The imager of claim 12, said dynamic electrode means comprising an electrically non-conductive sheet having a plurality of electrode strip means thereon for applying such surface charge to said other surface of said liquid crystal means.

14. The imager of claim 1, said input means being operative selectively to provide surface charge to respective areas over at least substantially the entire surface area of said sheet-like layout of liquid crystal means.

15. An image copying apparatus comprising:
    copier means for copying an image, and
    image means for forming characteristics of such image, including
    image forming and storing means for forming in real time characteristics of an image in response to a prescribed input and for temporarily storing such characteristics for a time adequate for said copier means to copy the same, such prescribed input comprising an electric field, and
    scanning means for scanning said image forming and storing means to apply such characteristics thereto,
    said image forming and storing means having charge storage capability to provide memory to store such characteristics,
    said copier means to make a copy of an image represented by the characteristics formed and stored by the image forming and storing means.

16. The apparatus of claim 15, said copier means comprising a photocopier.

17. The apparatus of claim 15, said image forming and storing means comprising a liquid crystal material in a support medium forming encapsulated liquid crystal material, said support medium having a characteristic of total internal reflection of light scattered by said liquid crystal material and impinging on an interface of said medium at an angle exceeding a predetermined angle with respect to normal, and said copier means including light source means for illuminating said encapsulated liquid crystal material to scan the same for forming a copy of the characteristics of an image formed by such encapsulated liquid crystal material.

18. The apparatus of claim 17, said copier means having a fixed platen and being able to copy an image formed approximately at said platen.

19. The apparatus of claim 15, said image forming and storing means comprising liquid crystal means having an alterable optical function for affecting the transmission, scattering or absorption of light incident thereon.

20. The apparatus of claim 19, further comprising containment medium means for containing said liquid crystal means in closed or partly closed capsule-like volumes, said liquid crystal means having positive dielectric anisotropy, said containment medium means having an index of refraction substantially matched to the ordinary index of refraction of said liquid crystal means and different from the extraordinary index of refraction of said liquid crystal means.

21. The apparatus of claim 20, wherein said liquid crystal means comprises operationally nematic liquid crystal, and said containment medium means comprises means for distorting the natural structure of the liquid crystal in the absence of an electric field, said scanning means comprising electrode means for applying an electric field to selected areas of said liquid crystal means in the form of a surface charge to the same to cause the liquid crystal structure to align with respect to such electric field to reduce such scattering or absorption and to increase such transmission.

22. The apparatus of claim 21, wherein said containment medium means is totally internally reflective of at least some light scattered therein by said liquid crystal means to re-illuminate that liquid crystal scattering such light.

23. The apparatus of claim 22, further comprising support means for supporting said image forming and storing means with respect to said copier means.

24. The apparatus of claim 15, said image forming and storing means comprising a sheet-like layer of encapsulated liquid crystal material having an electrode on one surface and a second surface, and said scanning means comprising dynamic electrode means for selectively applying surface charge to respective areas of said other surface of said liquid crystal material.

25. The apparatus of claim 15, said image forming and storing means comprising encapsulated liquid crystal material having a capacitance characteristic and being capable of storing an electric charge applied thereto as a surface charge as such storing function, whereby such surface charge effects application of an electric field toliquid crystal material proximate thereto tending to effect alignment fo such liquid crystal material with respect to such electric fields, said liquid crystal means having opposite relatively flat surfaces, and further comprising an electrode proximate one of said surfaces of said liquid crystal means, said scanning means comprising a dynamic electrode means for applying selectively such surface charge to respective areas of said other surface of said liquid crystal means.

26. A graphics copying method, comprising
applying respective charge inputs to selected areas of a sheet-like liquid crystal material to cause the liquid crystal material to affect the transmission, scattering or absorption of incident light thereby to form characteristics of an image,
storing such charge inputs to continue the formation of such characteristics of an image, and
using a copying process copying such characteristics to form a copy of such an image.

27. The method of claim 26, said applying comprising applying surface charge to a surface of such liquid crystal material.

28. The method of claim 26, wherein said storing comprises storing such charge inputs on the surface of said sheet-like liquid crystal material.

29. A method for creating an electric field across selected locations of a sheet-like liquid crystal device, comprising effective relative movement of a dynamic electrode having plural electrodes and such sheet, and applying voltage to one or more selected electrodes during such relative movement.

30. The method of claim 29, further comprising during such relative movement applying a different electric charge to a given location relative to that previously deposited thereto to discharge the same.

31. Apparatus for mechanically depositing electric charge to a surface of a sheet-like liquid crystal material having opposite surfaces, comprising a dynamic electrode having plural electrode means respectively electrically isolated from each other for applying electrical surface charge with respect to selected surface areas of such sheet-like liquid crystal material, electrical means for applying an electrical voltage to respective electrode means, and movement means for effecting relative movement of said dynamic electrode and such sheet-like liquid crystal material.

32. The apparatus of claim 31, further comprising control means for determining selected electrode means that receive an electrical voltage as a function of the relative movement between said dynamic electrode and such sheet-like liquid crystal material.

33. The apparatus of claim 32, wherein said dynamic electrode is a cylinder having an axis of rotation about which such cylinder may rotate for movement relative to such sheet-like liquid crystal material, and said electrode means are generally annularly about such cylinder and axis thereof.

34. The apparatus of claim 32, said dynamic electrode comprising a generally sheet-like support and said electrode means comprising strip-like electrodes positioned in generally parallel arrangement on said support.

35. The apparatus of claim 32, said control means comprising means for applying surface charge to selected portions of such sheet-like liquid crystal material.

36. The apparatus of claim 32, said control means comprising means for applying and removing surface charge with respect to selected surface areas of such sheet-like liquid crystal material.

37. In combination, a sheet of liquid crystal material having optical characteristics alterable in response to application of an electric charge, said liquid crystal material comprising operationally nematic liquid crystal in a containment medium means for distorting the natural structure of the liquid crystal material in the absence of an electric field, deposition means for mechanically depositing surface charge to selected surface areas on one side of said sheet to alter such optical characteristics, and electrode means on the opposite side of said sheet.

38. An imager, comprising:
liquid crystal means having an alterable optical function for affecting the transmission, scattering or absorption of light incident thereon,
support means for supporting said liquid crystal means in sheet-like layout,
said liquid crystal means being responsive to a prescribed input to alter such optical function to form characteristics of an image,
input means for selectively applying such prescribed input to respective portions of said liquid crystal means, such prescribed input comprising an electric field,
said liquid crystal means having a capacitance characteristic being capable of storing a voltage charge applied thereto as a surface charge to provide a memory function for temporarily storing such characteristics of an image after termination of a direct input thereto by said input means, and said liquid crystal means having opposite surfaces, and said input means comprising an electrode proximate one of said liquid crystal means and a dynamic electrode means for applying surface charge to selected areas of the other surface of said liquid crystal means, said dynamic electrode means comprising an electrically non-conductive cylinder having a plurality of electrically isolated, parallel electrode strip means thereon for applying such surface charge.

39. The imager of claim 38, further comprising means for rotating said dynamic electrode means to move the same along said other surface of said liquid crystal means as such electrode strip means trace lines therealong.

40. An imager, comprising:

liquid crystal means having an alterable optical function for affecting the transmission, scattering or absorption of light incident thereon, support means for supporting said liquid crystal means in sheet-like layout, said liquid crystal means being responsive to a prescribed input to alter such optical function to form characteristics of an image, input means for selectively applying such prescribed input to respective portions of said liquid crystal means, such prescribed input comprising an electric field, said liquid crystal means having a capacitance characteristic being capable of storing a voltage charge applied thereto as a surface charge to prvovide a memory function for temporarily storing such characteristics of an image after termination of a direct input thereto by said input means, and said liquid crystal means having opposite surfaces, and said input means comprising an electrode proximate one of said liquid crystal means and a dynamic electrode means for applying surface charge to selected areas of the other surface of said liquid crystal means, and further comprising pull-back means for pulling back said dynamic electrode means with a peeling type action while said electrode strip means deposit surface charge to selected areas of said other surface of said liquid crystal means.

41. An imager, comprising:

liquid crystal means having an alterable optical function for affecting the transmission, scattering or absorption of light incident thereon, support means for supporting said liquid crystal means in sheet-like layout, said liquid crystal means being responsive to a prescribed input to alter such optical function to form characteristics of an image, input means for selectively applying such prescribed input to respective portions of said liquid crystal means, such prescribed input comprising an electric field, said liquid crystal means having a capacitance characteristic being capable of storing a voltage charge applied thereto as a surface charge to provide a memory function for temporarily storing such characteristics of an image after termination of a direct input thereto by said input means, and said liquid crystal means having opposite surfaces, and said input means comprising an electrode proximate one of said liquid crystal means and a dynamic electrode means for applying surface charge to selected areas of the other surface of said liquid crystal means, said dynamic electrode means comprising a plurality of electrode means movable with respect to a surface of said liquid crystal means selectively to apply surface charge to respective areas thereof, and further comprising decoder means responsive to input information to the imager for converting such input information to voltages applied to respective electrode strip means as a function of which portions of the electrode strip means are engaged with a surface of said liquid crystal means thereby to effect the depositing of surface charge to such selected areas.

42. An image copying apparatus comprising:

copier means for copying an image, and image means for forming characteristics of such image, including image forming and storing means for forming in real time characteristics of an image in response to a prescribed input and for temporarily storing such characteristics for a time adequate for said copier means to copy the same, and scanning means for scanning said image forming and storing means to apply such characteristics thereto, said copier means and image means being relatively positioned for the copier means to make a copy of an image represented by the characteristics formed and stored by the image forming and storing means, said image forming and storing means comprising a liquid crystal material in a support medium forming encapsulated liquid crystal material, said support medium having a characteristic of total internal reflection of light scattered by said liquid crystal material and impinging on an interface of said medium at an angle exceeding a predetermined angle with respect to normal, said copier means including light source means for illuminating said encapsulated liquid crystal material to scan the same for forming a copy of the characteristics of an image formed by such encapsulated liquid crystal material and said copier means having a movable carrier, and said scanning means comprising a dynamic electrode means for applying surface charge to respective areas of said image forming and storing means as said movable carrier carries said image forming and storing means past said scanning means.

43. An image copying apparatus comprising:

copier means for copying an image, and image means for forming characteristics of such image, including image forming and storing means for forming in real time characateristics of an image in response to a prescribed input and for temporarily storing such characteristics for a time adequate for said copier means to copy the same, and scanning means for scanning said image forming and storing means to apply such characteristics thereto, said copier means and image means being relatively positioned for the copier means to make a copy of an image represented by the characteristics formed and stored by the image forming and storing means, said image forming and storing means comprising encapsulated liquid crystal material having a capacitance characteristic and being capable of storing an electric charge applied thereto as a surface charge as such storing function, whereby such surface charge effects application of an electric field to liquid crystal material proximate thereto tending to effect alignment of such liquid crystal material with respect to such electric fields, said liquid crystal means having opposite relatively flat surfaces, an electrode proximate one of said surfaces of said liquid crystal means, said scanning means comprising a dynamic electrode means for applying selectively such surface charge to respective areas of said other surface of said liquid crystal means, said dynamic electrode means comprising a plurality of electrode means movable with respect to a surface of said liquid crystal means selectively to apply surface charge to respective areas thereof, and decoder means responsive to input information to the imager for converting the same to voltages applied to respective electrode strip means as a function of which portions of the electrode strip means are engaged with a surface of said liquid crystal means thereby to effect the depositing of surface charge to such selected areas.

44. A graphics copying method, comprising applying respective prescribed inputs to selected areas of a sheet-like liquid crystal material to cause the liquid crystal material to affect the transmission, scattering or absorption of incident light thereby to form characteristics of an image, said applying comprising applying surface charge to a surface of such liquid crystal material using a dynamic electrode movable along a surface of such liquid crystal material and coordinated with the effective position thereon to leave surface charge as such electrode moves out of engagement with respective surface areas of such liquid crystal material, and using a copying process copying such characteristics to form a copy of such an image.

45. The method of claim 44, wherein such dynamic electrode includes a plurality of individual electrodes, and further comprising receiving input data representing an image, decoding such input data, and based on such decoding and coordinated with the relative position of such dynamic electrode on such liquid crystal material, selectively applying voltage to respective ones of such electrode strips included in such electrodes of such dynamic electrode.

46. In combination, a sheet of liquid crystal material having optical characteristics alterable in response to application of an electric charge, deposition means for mechanically depositing surface charge to selected surface areas on one side of said sheet to alter such optical characteristics, and electrode means on the opposite side of said sheet, said deposition mean comprising a dynamic electrode and said dynamic electrode and said sheet being relatively movable.

47. The invention of claim 46, further comprising circuit means for controlling relative movement of said dynamic electrode and said sheet and for determining which such surface areas are selected to have surface charge deposited thereto.

48. An image forming method comprising applying respective charge inputs to selected areas of a sheet-like liquid crystal material to cause the liquid crystal material to affect the transmission, scattering or absorption of incident light thereby to form characteristics of an image, and storing such charge inputs to continue the formation of such characteristics of an image.

49. An image forming method comprising applying respective charge inputs to selected areas of a sheet-like liquid crystal material, storing such applied charge inputs by such sheet-like liquid crystal material, and using such stored charge to affect the transmission, scattering or absorption of incident light thereby to form characteristics of an image.

* * * * *